INVENTORS
ROBERT M. MAZO &
SIMON LARACH

BY
ATTORNEY

United States Patent Office 2,847,386
Patented Aug. 12, 1958

2,847,386
ELECTROLUMINESCENT MATERIALS

Robert M. Mazo, Camden, and Simon Larach, New Brunswick, N. J., assignors to Radio Corporation of America, a corporation of Delaware Application November 27, 1953, Serial No. 394,647

5 Claims. (Cl. 252—301.6)

This invention relates to new and improved electroluminescent materials, methods for preparing them, and devices incorporating them.

An electroluminescent material is a material which emits light when an electric field of sufficient magnitude is applied to it. Electroluminescent materials of the copper activated zinc sulphoselenide type and methods of producing them are described by Simon Larach and Robert M. Mazo in U. S. patent application Serial No. 394,636, filed November 27, 1953. The process disclosed in said application comprising heating together in an inert atmosphere, a mixture consisting essentially of substances containing only the three elements zinc, sulphur and selenium, about 0.88% to 0.5% by weight of copper and about 0.2% to 10% by weight of a halide selected from the group consisting of chlorides, bromides and iodides. While materials produced by said process are markedly better than previously known electroluminescent materials, further improvements in efficiency, light emissions and reproducibility are desirable.

An object of the present invention is to provide new and improved electroluminescent materials.

A further object is to provide electroluminescent materials having relatively high emission intensities and improved efficiencies.

Another object is to provide electroluminescent materials that are highly resistant to "burn" and more readily reproducible.

A further object of this invention is to provide improved methods for preparing the electroluminescent materials of this invention.

Another object is to provide devices incorporating the electroluminescent materials of this invention.

The foregoing objects and other advantages may be accomplished in accordance with the present invention which includes the use of a firing atmosphere containing free bromine. The invention also includes the use of a halide flux to increase resistance to burn in the material and to yield a more uniform product. A method for producing an electroluminescent material of the invention comprising heating together in an atmosphere containing free bromine, a mixture comprising about 50 to 70 mole parts of zinc sulphide, about 50 to 30 mole parts of zinc selenide and about 0.08% to 0.2% by weight of copper. This invention also includes the electroluminescent materials produced by the foregoing process; and devices comprising a layer of a dielectric medium having dispersed therein a finely-divided electroluminescent material of this invention and means for applying an electric field thereto.

The invention will be described in greater detail by reference to the accompanying drawing in which.

Example 1

To 10.17 grams of pure zinc sulphide and 9.83 grams of pure zinc selenide, add 0.020 gram of copper as an aqueous solution of copper chloride. This mixture is slurried with triple distilled water and dried at about 150° C. The dried material is placed in a firing container such as a silica dish, which is placed in a cool transparent furnace tube such as quartz glass. The air is flushed out of the tube with a gaseous mixture produced by passing 200 ml. per minute of nitrogen over liquid bromine at room temperature. The flushing is continued until, after about 2 minutes, the surface of the mix turns to a reddish-brown color. The flow of nitrogen over the liquid bromine is reduced to about 20 ml. per minute and the resultant mixture is passed through the furnace tube. The tube is inserted in a furnace maintained at about 1100° C. and allowed to remain therein for about 30 minutes. The furnace tube is removed from the furnace and allowed to cool with the nitrogen-bromine mixture still flowing. After coolings, the nitrogen-bromine flow is stopped, and the reaction produce is removed from the furnace tube.

Figure 1:
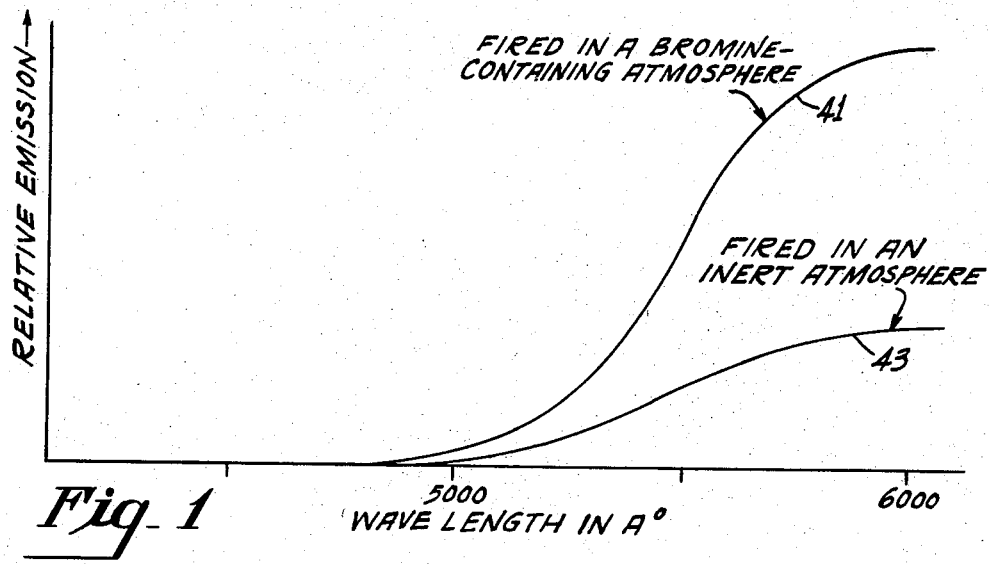
Figure 1 is a graph illustrating the relative spectral distribution of the emission of an electroluminescent material of this invention fired in an atmosphere containing free bromine and a corresponding material fired in an inert atmosphere.

The material prepared in Example 1 has the approximate formula 0.60 ZnS : 0.40 ZnSe : Cu(0.1). It is light green in color, very soft and has a very small particle size. The color of the electroluminescence emission is yellow. Referring to Figure 1, curve 41 shows the relative spectral distribution of the electroluminescent material of Example 1 and curve 43 shows the relative spectral distribution of a corresponding material fired in an inert atmosphere. It can be seen that while the spectral distribution of both materials is almost identical, the relative intensity of emission of the material fired in the bromine-containing atmosphere is about three times as great as the material fired in an inert atmosphere. A curve similar to curve 43 is obtained for a material produced by firing in an inert atmosphere the mixture of Example 1 including about 2% by weight of a halide.

The nitrogen serves as a carrier and as a diluent for the bromine. Any inert gas, for example, argon, neon or helium may be used. The rate of flow of nitrogen over the bromine and of the bromine-nitrogen mixture over the mix is not critical.

The optimum firing time has been found to be 30 minutes although it may vary widely. A preferred range is 20 to 40 minutes. Firing time depends in part on the size of the batch, the packing density and the cross-sectional area of the batch. Since firing is carried out in order to (1) diffuse the copper activator and (2) to crystallize the material, the firing time is not critical so long as there is a sufficient time to accomplish these steps.

The firing temperature has been found to be more critical than the firing time. While good electroluminescent materials may be prepared by firing between 1000° C. and 1200° C., the optimum value is in the neighborhood of 1100° C. Materials prepared by firing above 1200° C. or below 1000° C. may also exhibit electroluminescent properties. The color of electroluminescence emission may be varied by varying the ratio of zinc sulphide to zinc selenide, which ratio may be varied over the entire range of possible mixtures. However, the very marked increase in electroluminescence emission intensity is most marked in the range of mixture compositions containing about 50 to 70 mole parts of zinc sulphide to about 50 to 30 mole parts of zinc selenide.

The copper added in minor amounts serves as an activator in the host crystal of the material. It has been established that the incorporation of as little as 0.08% by weight and as much as 0.2% by weight of copper produces good results. This is of the order of 10 to 30 times the amount of copper used in cathodoluminescent phosphors. The optimum amount is approximately 0.1%. The copper may be incorporated by any convenient method known in the phosphor art. It is convenient to add the copper as a soluble salt, preferably copper chloride, in an aqueous solution at the start of the process.

The material of Example 1, when subjected to a sufficient electric field, emits light by electroluminescence as described above but "burns" very rapidly. By "burn" is meant the decrease in electroluminescence emission intensity due to the effects of the applied electric field. It is desirable therefore to provide a method of increasing the ability of the material to resist burn.

*Example 2*

To 10.17 grams of pure zinc sulphide and 9.83 grams of pure zinc selenide, add 0.020 gram of copper as an aqueous solution of copper chloride and 0.40 gram of ammonium bromide. This mixture is slurried, dried and fired as in Example 1. The product is almost identical with the product of Example 1, except that the material is practically free of "burn."

Figure 2:
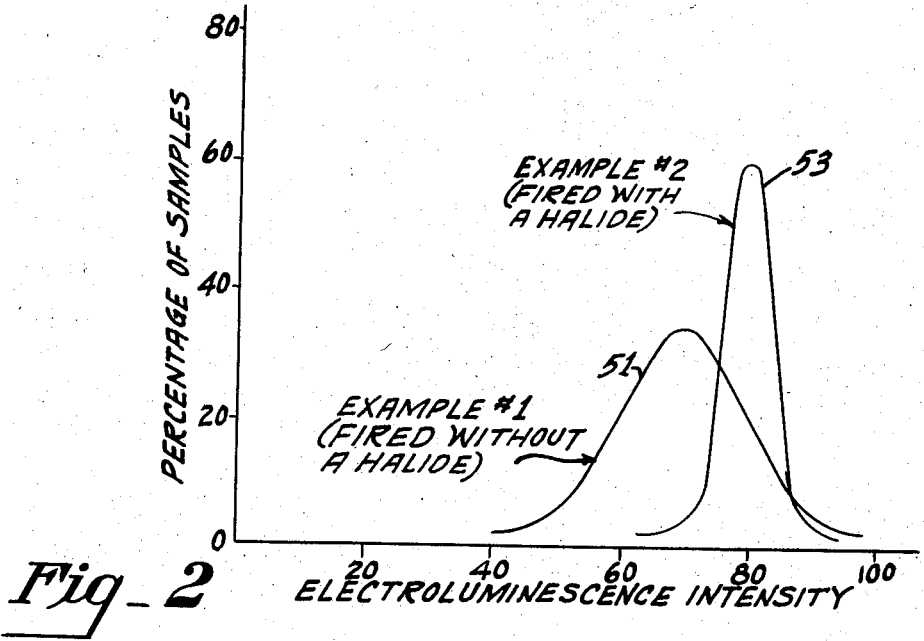
Figure 2 is a histogram illustrating the quality of product of numerous batches of an electroluminescent material of this invention fired without a halide and a corresponding material fired with ammonium bromide.

The relative intensity of electroluminescence emission varies from batch to batch. Referring to Figure 2, the results of batches fired according to the method of Example 1 is shown by a curve 51 and the results of batches fired according to the method of Example 2 is shown by a curve 53. It can be seen that the addition of ammonium bromide increases the electroluminescence emission somewhat and produces a much more uniform product. Considerably greater amounts of usable and uniform product is produced both from batch-to-batch and within a batch when ammonium bromide is added. Since the use of ammonium bromide in the absence of free bromine produces a material of considerably lower electroluminescence emission than when fired in the presence of free bromine, the ammonium bromide in the process of Example 2 is believed to act as a stabilizer in that it increases resistance to burn and increases uniformity of the product.

Although ammonium bromide is used in Example 2, chlorides, bromides and iodides of the alkali metals, the alkaline earth metals and volatile cations may be used. However, ammonium bromide is preferred because excess amounts volatilize easily, and because the components do not adversely affect the electroluminescence of the material. Ammonium bromide or other halides may be added in amounts between about 0.1% and 10.0%. The preferred addition is about 2.0%.

Electroluminescent cells may be prepared by depositing a slurry comprising a finely powdered material of the invention suspended in a dielectric medium such as castor oil between a pair of transparent electrically conducting electrodes. The material emits light when a voltage is applied across the electrodes. It is preferred to use 60 cycle alternating voltages up to 2000 volts.

Figure 3:
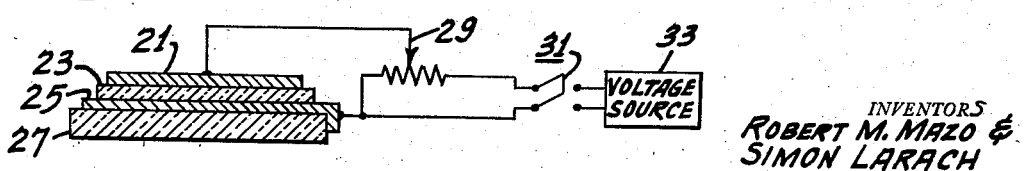
Figure 3 is a sectional, partially schematic view of an apparatus incorporating the electroluminescent materials of this invention.

While the above-described cell is satisfactory, a preferred embodiment is shown in Figure 3. The preferred cell comprises a transparent base 27 such as a sheet of glass, a transparent electrically-conducting layer 25 thereon such as treated tin chloride (NeSa), a layer 23 thereon comprising a powdered material of this invention dispersed in a solid or semisolid dielectric medium of reasonable light-transmitting properties such as wax, resin or plastic, and a metallic coating 21 thereon such as aluminum. The metallic coating 21 and the transparent electrically-conducting coating 25 are connected to an A.-C. voltage source 33 through a switch 31 and a potentiometer 29. Upon applying a voltage, light may be observed through the transparent base 27. Generally, the higher the intensity of the electric field across the electroluminescent layer 23, the greater the light emission intensity.

There has thus been described a new and improved series of electroluminescent copper-activated zinc sulphoselenides having relatively high emission intensities, improved efficiencies, high resistance-to-burn and better reproducibility. There has also been described improved processes for producing the materials of this invention and improved devices incorporating them.

What is claimed is:

1. A method for producing an electroluminescent material which comprises heating together in a bromine containing atmosphere at temperatures of about 1000° C. to 1200° C. a mixture comprising about 50 to 70 mole percent of zinc sulphide, about 50 to 30 mole percent of zinc selenide, and about 0.08% to 0.2% by weight of copper activator.

2. A method for producing an electroluminescent material which comprises heating together in an atmosphere containing free bromine at temperatures of about 1000° C. and 1200° C. a mixture consisting essentially of about 50 to 70 mole percent of zinc sulphide, about 50 to 30 mole percent of zinc selenide, about 0.08% to about 0.2% by weight of copper activator and about 0.1% to about 10% by weight of a halide selected from the group consisting of chlorides, bromides and iodides of the alkali metals, the alkaline earth metals and volatile cations.

3. A method for producing an electroluminescent material which comprises heating together in an atmosphere containing free bromine at temperatures of about 1000° C. to 1200° C., a mixture consisting essentially of about 50 to 70 mole percent of zinc sulphide, about 50 to 30 mole percent of zinc selenide, about 0.08% to about 0.2% by weight of copper activator and about 0.1% to about 10% by weight of ammonium bromide.

4. A method for producing an electroluminescent material which comprises heating together in an atmosphere containing free bromine at about 1100° C. 60 mole precent of zinc sulphide, 40 mole percent of zinc selenide and 0.1% by weight of copper as copper chloride.

5. A method for producing an electroluminescent material which comprises heating together in an atmosphere containing free bromine at about 1100° C. 60 mole percent of zinc sulphide, 40 mole percent of zinc selenide, about 0.1% by weight of copper as copper chloride and about 2% by weight of ammonium bromide.

References Cited in the file of this patent

UNITED STATES PATENTS

| | | |
|---|---|---|
| 2,566,349 | Mager | Sept. 4, 1951 |
| 2,660,566 | Froelich | Nov. 24, 1953 |
| 2,731,423 | Prener | Jan. 17, 1956 |

OTHER REFERENCES

Homer: Article on "Electroluminescent Zinc Sulfide Phosphors," J. Electrochem. Soc., December 1953, vol. 100, No. 12, pp. 566–571.

UNITED STATES PATENT OFFICE
CERTIFICATE OF CORRECTION

Patent No. 2,847,386                 August 12, 1958

Robert M. Mazo et al.

It is hereby certified that error appears in the printed specification of the above numbered patent requiring correction and that the said Letters Patent should read as corrected below.

Column 1, line 28, for "0.88% to 0.5%" read -- 0.08% to 0.5% --; column 2, line 29, for "produce" read -- product --.

Signed and sealed this 28th day of October 1958.

(SEAL)
Attest:
KARL H. AXLINE
Attesting Officer

ROBERT C. WATSON
Commissioner of Patents